(12) United States Patent
Mohan et al.

(10) Patent No.: US 12,189,514 B2
(45) Date of Patent: Jan. 7, 2025

(54) SYSTEM AND METHOD FOR CLOUD INFRASTRUCTURE TEST AUTOMATION

(71) Applicant: Accenture Global Solutions Limited, Dublin (IE)

(72) Inventors: Bachu Mohan, Hyderabad (IN); Mahesh Venkataraman, Bangalore (IN); Mallika Fernandes, Bangalore (IN); Murali Krishna Rao Koppaka, Bangalore (IN); Pandiaraj Balaravisekar, Chennai (IN)

(73) Assignee: Accenture Global Solutions Limited, Dublin (IE)

( * ) Notice: Subject to any disclaimer, the term of this patent is extended or adjusted under 35 U.S.C. 154(b) by 337 days.

(21) Appl. No.: 17/714,577

(22) Filed: Apr. 6, 2022

(65) Prior Publication Data

US 2023/0325298 A1    Oct. 12, 2023

(51) Int. Cl.
*G06F 11/36*    (2006.01)
*G06F 11/22*    (2006.01)

(52) U.S. Cl.
CPC ...... *G06F 11/3612* (2013.01); *G06F 11/2273* (2013.01)

(58) Field of Classification Search
None
See application file for complete search history.

(56) References Cited

U.S. PATENT DOCUMENTS

| | | | |
|---|---|---|---|
| 10,360,025 B2 | 7/2019 | Foskett et al. | |
| 11,074,165 B2 | 7/2021 | Khakare et al. | |
| 11,153,224 B2 * | 10/2021 | Halimi | G06F 9/5077 |
| 2020/0278920 A1 * | 9/2020 | Khakare | G06F 9/547 |
| 2023/0048653 A1 * | 2/2023 | Tripathi | G06F 8/35 |

OTHER PUBLICATIONS

Hassan Mohammad Mehedi et al: "As Code Testing: Characterizing Test Quality in Open Source Ansible Development", 2022 IEEE Conference On Software Testing, Verification and Validation (ICST), IEEE, Apr. 4, 2022 (Apr. 4, 2022), pp. 208-219, XP034132615, DOI: 10.1109/ICST53961.2022.00031 [retrieved on Jun. 8, 2022] * p. 208-p. 216*.

Hasan Mohammed Mehedi Mehedi.Bueteee23@gmail.com et al: "Testing practices for infrastructure as code", Proceedings of the 36th Annual ACM Symposium On Applied Computing, ACMPUB27, New York, NY, USA, Nov. 8, 2020 (Nov. 8, 2020), pp. 7-12, XP058738396, DOI: 10.1145/3416504.3424334, ISBN: 978-1-4503-8128-4 * p. 7-p. 11*.

"Terratest by Gruntwork.io—Documentation—Learn how to work with Terratest," Retrieved May 5, 2022 from Internet:.

"Progress Chef—An Overview of Chief InSpec", dated Apr. 8, 2022, 2 pages. Retrieved May 5, 2022 from Internet:.

* cited by examiner

*Primary Examiner* — Lewis A Bullock, Jr.
*Assistant Examiner* — Mark A Gooray

(57) ABSTRACT

An automated, dynamic system and method of testing infrastructure-as-code (IaC). The system is configured to validate infrastructure provisioned in multi-cloud environments and is able to accommodate any cloud provider. Implementation of such as system can eliminate manual errors, as well as enable early detection of errors (i.e., before production deployment), thus empowering early 'go live'. Furthermore, the proposed embodiments are configured to integrate with already existing devOps pipelines for rapid test execution and can run as many times as needed with minimal configuration, allowing for creation and execution of complex scenarios to test low-level validation upon cloud infrastructure setup.

15 Claims, 12 Drawing Sheets

SYSTEM AND METHOD FOR CLOUD INFRASTRUCTURE TEST AUTOMATION

TECHNICAL FIELD

The present disclosure generally relates to the automation of infrastructure-as-code (IaC) testing, and in particular to validation of IaC for deployment in single or multi-cloud environments.

BACKGROUND

Infrastructure is a core tenet of a software development process—it is directly responsible for the stable operation of a software application. This infrastructure can range from servers, load balancers, firewalls, and databases to complex container clusters. However, traditional approaches for manually-provisioning infrastructure and meet the demands of DevOps-based modern rapid software development cycles have become an unscalable solution.

Infrastructure as code is a powerful tool that has developed in the wake of cloud computing technology that provides scalability. Infrastructure as Code, or IaC, is the process of provisioning and managing infrastructure defined through code, instead of doing so with a manual process. IaC allows businesses to manage cloud infrastructures purely through code. There is no longer a need for manual configuration, and updates to the infrastructure can be performed by following the same process of development and deployment. IaC validation plays a key role in this process by allowing testers to test against known issues and continue to monitor and test during production.

Unfortunately, although testing is a key phase of successful deployment of cloud infrastructure and dependent and/or related software with a required configuration, the process has remained riddled with errors. Manual recreation of a live environment leaves doors open to a multitude of human errors that can require repeated troubleshooting and corrective actions, and in some cases cause significant loss to the software client.

There is a need in the art for a system and method that addresses the shortcomings discussed above.

SUMMARY

The proposed systems and methods describe an automated, dynamic process for testing infrastructure-as-code (IaC) and resources provisioned by the IaC. The system and method solve the problems discussed above by providing a mechanism by which to transform business requirement data into validation test scenarios that automatically identify the resources and cloud platform capable of supporting the given IaC. This approach allows the IaC code to be testing in production-level conditions while only being deployed in sandbox (pre-production environment) during performance of the automated test validation. The system is configured to validate infrastructure provisioned in multi-cloud environments and is able to accommodate any cloud provider. These features (among others described) are specific improvements in way that the underlying computer system operates. In addition, the proposed system solves technical challenges with infrastructure instantiation and validation, as well as software development targeted for use in multi-cloud platform execution environments. The improvements facilitate a more efficient, accurate, consistent, and precise building of resources that operate properly immediately upon entering the production environment. The improved functioning of the underlying computer hardware itself achieves further technical benefits. For example, the system avoids tedious testing cycles and lack of automation, reduces manual intervention, reduces the possibility for human error, therefore increasing infrastructure instantiation efficiency and reduces wait times for correct resource setup and execution. In addition, the system provides additional abstraction, so that testers need not be experts in validation of complex IaC syntaxes. The testers may instead concentrate on the particular goals of their projects with less time and energy spent on transitioning intricate IaC coding from sandbox to production.

In one aspect, the disclosure provides a computer implemented method of validating infrastructure as code (IaC). The method includes a first step of receiving, at a scripting layer of a cloud infrastructure test automation system, a first resource requirement. A second step includes producing, via the scripting layer and based on the first resource requirement, a first script and a first test dataset, and a third step includes receiving, at a scanning agent of a decision layer of the system, the first script and first test dataset. In addition, the method includes a fourth step of generating, via the scanning agent, a first set of logical blocks selected based on the first script and the first test dataset, each logical block representing a group of resources, and a fifth step of performing a first series of test runs of the IaC in a sandbox environment, each test run validating a scenario based on resources specified by one of the logical blocks of the first set. Furthermore, the method includes a sixth step of presenting, at a client computing device, a first report indicating a status of the scenario validated during a test run In another aspect, the disclosure provides a non-transitory computer-readable medium storing software comprising instructions executable by one or more computers which, upon such execution, cause the one or more computers to: (1) receive, at a scripting layer of a cloud infrastructure test automation system, a first resource requirement for an infrastructure as code (IaC); (2) produce, via the scripting layer and based on the first resource requirement, a first script and a first test dataset; (3) receive, at a scanning agent of a decision layer of the system, the first script and first test dataset; (4) generate, via the scanning agent, a first set of logical blocks selected based on the first script and the first test dataset, each logical block representing a group of resources; (5) perform a first series of test runs of the IaC in a sandbox environment, each test run validating a scenario based on resources specified by one of the logical blocks of the first set; and (6) present, at a client computing device, a first report indicating a status of the scenario validated during a test run.

In yet another aspect, the disclosure provides a system for validating infrastructure as code (IaC), the system comprising one or more computers and one or more storage devices storing instructions that may be operable, when executed by the one or more computers, to cause the one or more computers to: (1) receive, at a scripting layer of a cloud infrastructure test automation system, a first resource requirement for an infrastructure as code (IaC); (2) produce, via the scripting layer and based on the first resource requirement, a first script and a first test dataset; (3) receive, at a scanning agent of a decision layer of the system, the first script and first test dataset; (4) generate, via the scanning agent, a first set of logical blocks selected based on the first script and the first test dataset, each logical block representing a group of resources; (5) perform a first series of test runs of the IaC in a sandbox environment, each test run validating a scenario based on resources specified by one of the logical blocks of the first set; and (6) present, at a client computing device, a first report indicating a status of the scenario validated during a test run.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

While various embodiments are described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature or element of any embodiment may be used in combination with or substituted for any other feature or element in any other embodiment unless specifically restricted.

This disclosure includes and contemplates combinations with features and elements known to the average artisan in the art. The embodiments, features, and elements that have been disclosed may also be combined with any conventional features or elements to form a distinct invention as defined by the claims. Any feature or element of any embodiment may also be combined with features or elements from other inventions to form another distinct invention as defined by the claims. Therefore, it will be understood that any of the features shown and/or discussed in the present disclosure may be implemented singularly or in any suitable combination. Accordingly, the embodiments are not to be restricted except in light of the attached claims and their equivalents. Also, various modifications and changes may be made within the scope of the attached claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

As noted above, Infrastructure resource provisioning in cloud is done with new trending "Infrastructure as Code" (IaC) tools such as Terraform®, Chef®, Ansible®, Helm®, AWS CloudFormation®, Azure Resource Manager®, Google Cloud Deployment Manager®, etc. In general, IaC encompasses the management and provisioning of cloud resources through code, rather than through manual processes. IaC tools are used by organizations to set up complex infrastructure in a cloud environment. For purposes of this application, IaC describes the specifications of required infrastructure (e.g., VMs, storage, networking, and others configurations) in text form as 'Code'. In other words, IaC is a process of managing and provisioning cloud infrastructure through machine-readable definition files, rather than physical hardware configuration or interactive configuration tools. IaC can be versioned and used to deploy cloud environments independently. This code is then used as a basis for provisioning cloud infrastructure resources in a targeted cloud platform. The platform can be implemented as a single or multi-cloud environment.

While IaC has become a vital part of modern application development and deployment pipelines, it may be appreciated that any defects in IaC code can result in serious consequences. These defects are typically the result of human (e.g., developer) error. Once the developer writes the cloud infrastructure code in the form of IaC and the configuration management-related instructions that can trigger actions to provision cloud resources and deploy software with required configurations and more, several operational and compliance tests must be run, which often reveal a multitude of issues. However, many of these issues are only generated and noted after deployment of the software to the live, operational environment.

Figure 1A:
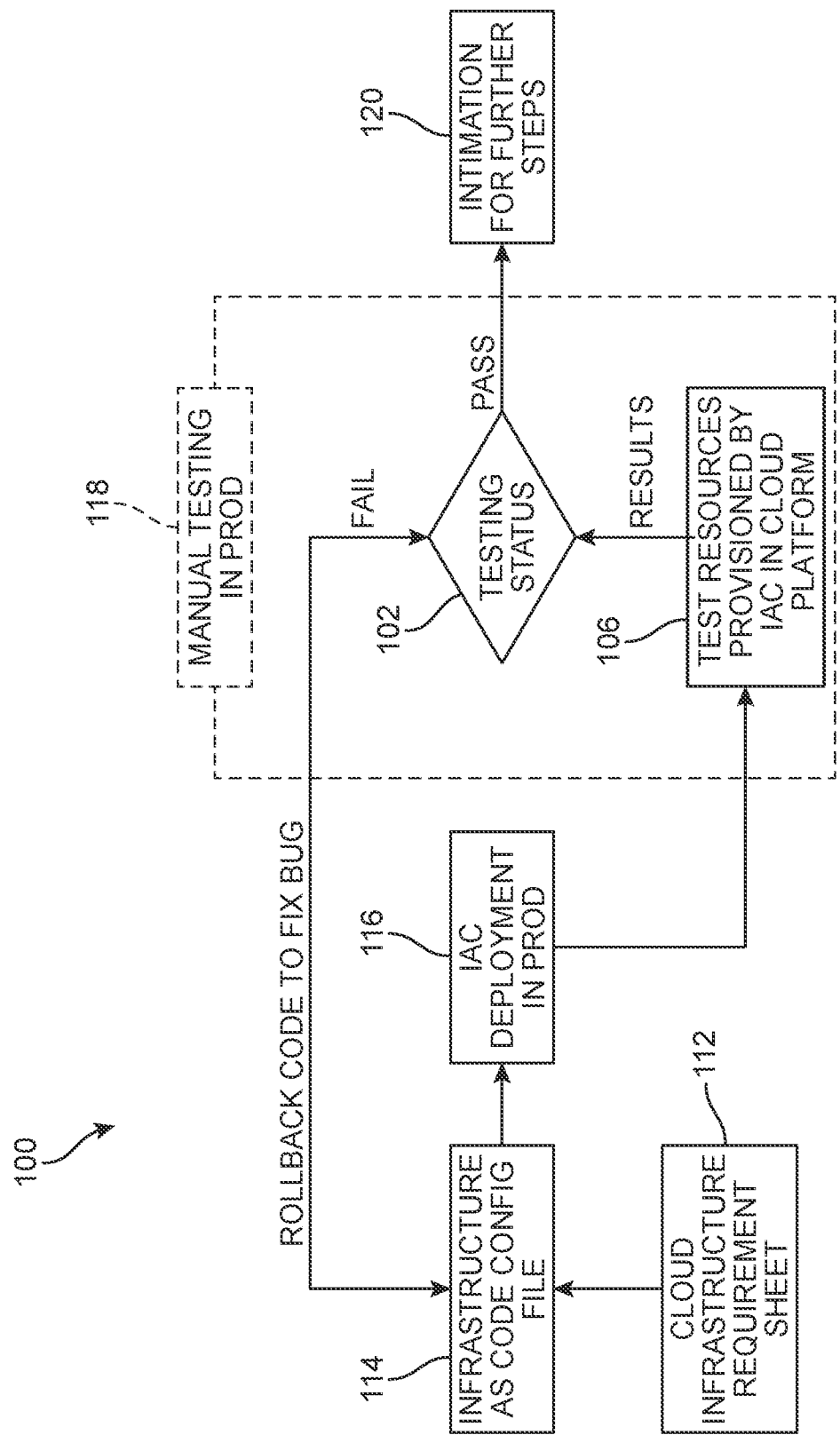
FIG. 1A is a conventional process for manual testing of infrastructure as code.

Therefore, testing is a key stage in the deployment process. Although the infrastructure is being provided using code, manual reviews of the provisioned infrastructure in the cloud platform have remained a time-consuming process, as well as one that is potentially costly, inefficient, and prone to errors. Furthermore, fault configurations can lead to major breakdowns in cloud infrastructure setup, and comprehensive testing cannot be conducted in production due to access and other permission issues. For purposes of reference, the schematic flow diagram of FIG. 1A depicts a conventional process 100 by which validation of IaC occurs. In a first stage 112, a cloud infrastructure requirement sheet is created and in a second stage 114, an initial IaC configuration file is generated. The code is deployed in a production environment in a third stage 116, and manual testing occurs during this time in a fourth stage 118. As part of the fourth stage 118, resources provisioned by the IaC in the cloud platform is tested (substep 106). If a resulting testing status 102 includes fail-type results, the code can be rollbacked to fix the bugs at the IaC configuration file level. This cycle can repeat many times, until the testing status 102 indicates the IaC has passed and can be intimated for further steps in a fifth stage 120.

In this type of approach, a single misconfiguration can lead to many major issues that impact the software performance and operations. In many cases, testing can be limited in real-world scenarios, with redundant or unwanted test executions being performed with no proper knowledge of what is being covered during testing. In addition, as noted above, manual testing of complex cloud architecture and infrastructure provisioning is highly inefficient, and bugs reported during production are costly to fix and can heavily impact businesses.

In contrast, the proposed embodiments remove the presence of manual errors, and allow for testing that occurs prior to actual 'live' deployment. Thus, any errors will not lead to any real-world harm. With the evolution of cloud services, configuration parameters are frequently updated and the number of IaC rollouts are expected to occur more often, sometimes even daily. These changes can affect the infrastructure resources in cloud. Even small changes can have a tremendous impact on the infrastructure deployed. Development teams must determine how to validate changes and their results safely and without affecting production environments.

Figure 1B:
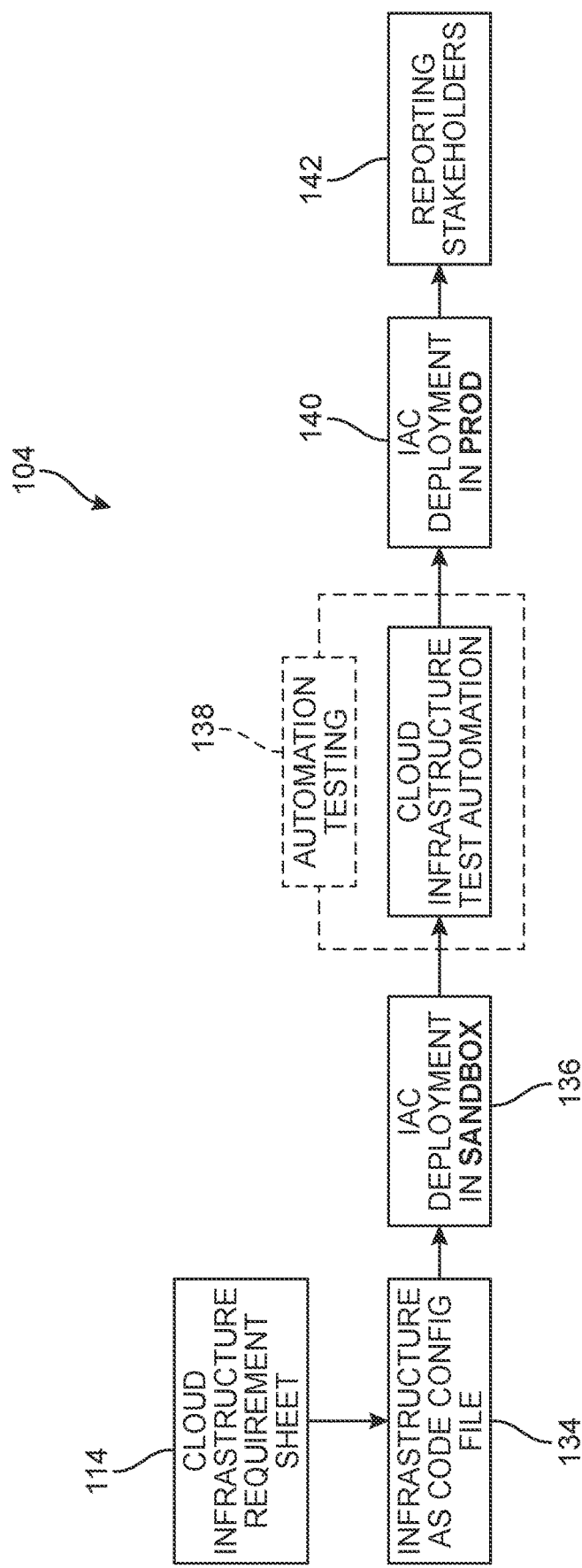
FIG. 1B is an overview of an embodiment of a process for an automated validation of infrastructure as code.

Unfortunately, the overhead to build and maintain an infrastructure test suite usually requires even greater investment than using infrastructure as code. However, the process of automation testing as described herein, offers a 'shift left' of the testing approach by integrating to devOps pipeline for each release while helping to eliminate the effect of human ignorance during testing complex area of cloud infrastructure. For purposes of introduction, a schematic diagram depicting an embodiment of the proposed process 104 is provided in FIG. 1B. In this case, a first stage 132 where a cloud infrastructure requirement sheet is created is the same as in FIG. 1A. In addition, a second stage 134, in which an initial IaC configuration file is generated, is also similar. However, in a third stage 136, rather than deploying the IaC in production, the IaC is deployed in sandbox. A fourth stage 138 in which automation testing occurs, builds confidence to deploy changes safely.

Traditionally, writing tests for infrastructure has been associated with a slow and heavy learning process for developers, and teams must build iteratively upon them. For instance, a cloud deployment can fail because of exceeded quotas, incorrect configurations, and others. In addition, there remains a risk that the deployment fails at the final stage where it tries to deploy. In addition, conventional test suites have consistently failed to replicate what happens in production inside their sandbox environment. Development teams that successfully do this are highly mature and have established guardrails to manage risks of testing in production, such as monitoring, observability and mature deployment schemes. In these cases, validation is highly dependent on the developer's experience and training.

In contrast, embodiments of the cloud infrastructure test automation system described herein automatically 'authors' a test that assesses the infrastructure before the deployment begins, to catch the risk of failure before it causes any real-world effects. In different embodiments, only when the IaC has successfully deployed in sandbox and passed the automated testing (see below) will the code be allowed to move into a fifth stage 140 of deployment in production, which can then be reported to stakeholders in a sixth stage 142.

As a general matter, infrastructure providers provide various cloud resources through delivery platforms that are generally publicly available. Infrastructure providers may additionally or alternatively provide these resources "on-premises", which typically refers to a location inside the enterprise that uses the resources, often including increased privacy, security, and control compared to public cloud resources. The proposed embodiments are configured to accommodate the available cloud resources, accessed over a network that provides connectivity within the infrastructure providers and between the infrastructure providers and other entities. The network may include private and public networks defined over any pre-determined and possibly dynamic internet protocol (IP) address ranges. For example, in different embodiments, an IaC architecture includes communication interfaces that establish communication channels with other entities over networks. Similarly, the communication interfaces in the infrastructure provider data centers and at the developer sites also establish communication channels with the other entities across the network. A few examples of communication channels running on top of the communication physical hardware include: HTTP, HTTPS, FTP, SMTP, Web Services, SOAP over HTTP/HTTPs, and REST over HTTP/HTTPs communication channels.

Figure 2:
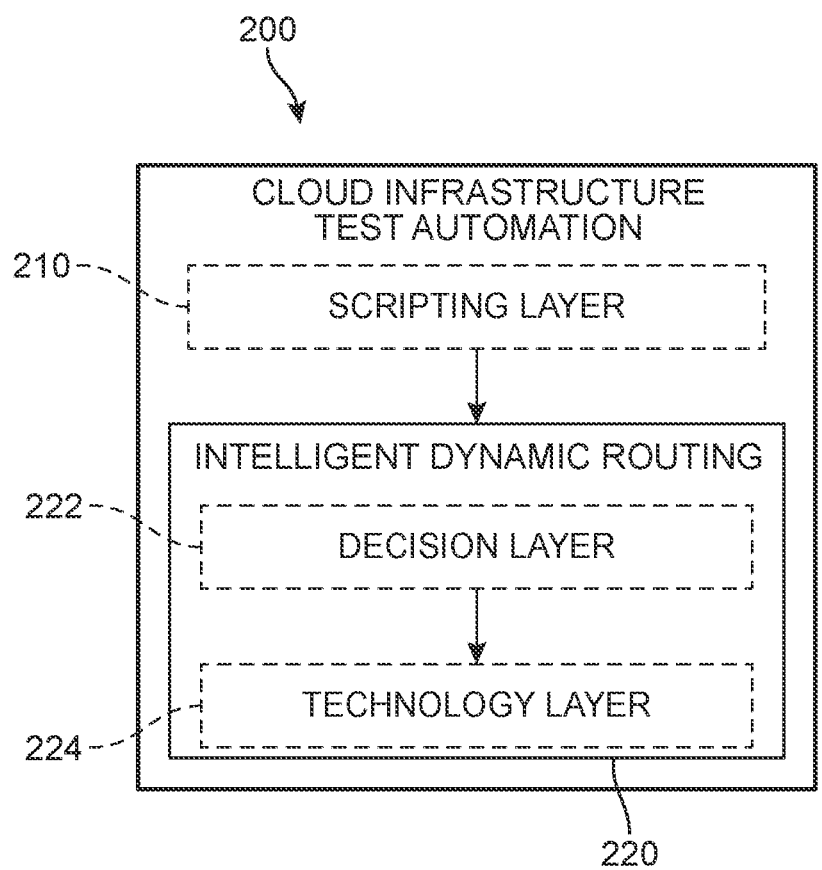
FIG. 2 is a high-level view of a cloud infrastructure test automation system, according to an embodiment.

Referring now to FIG. 2, a high-level view of an embodiment of a cloud infrastructure test automation system ("system") 200 is shown. Following IaC deployment in sandbox, implementation in an automated test environment may begin. More specifically, the system 200 includes a first layer, referred to herein as a scripting layer 210, and an intelligent dynamic routing module ("routing module") 220 comprising of a second layer, referred to as a decision layer 222 and a third layer, referred to as a technology layer 224

The scripting layer 210 can be understood to be responsible for the extraction and transformation the requirement details provided by a cloud infrastructure solution architect to more defined and structured data which is then used to generate infrastructure automation scripts. In other words, the system 200 is configured to transform developer requirements into meaningful data when necessary. Using this data, the system 200 can then generate the infrastructure test automation scripts. The IaC test automation scripts generated can be executed in the target cloud system(s).

The routing module 220 is designed to make intelligent and dynamic decisions based on test script received from the scripting layer 210. In addition, the routing module 220 can set up the automation test execution in a defined cloud or multi-cloud environment. The decision layer 222 provides the decision-making capability that can determine on what technology, target cloud platform, resource and configuration can setup require in order to test the infrastructure resources. This can be configured to multiple cloud platforms e.g., AWS, AZURE, GCP, Oracle and others. The technology layer 224 includes different components which can be categorized in a way that enables the system 200 to effectively identify the appropriate resources. In different embodiments, technology components can be categorized as (a) core components and (b) re-usable components. In general, the technology layer 224 solves the technical challenges of interacting with cloud platform and fetch the provisioned resources properties. Thus, the technology layer 224 receives the decision from the decision layer 222 and manages the system 200 access to the requisite components.

Figure 3:
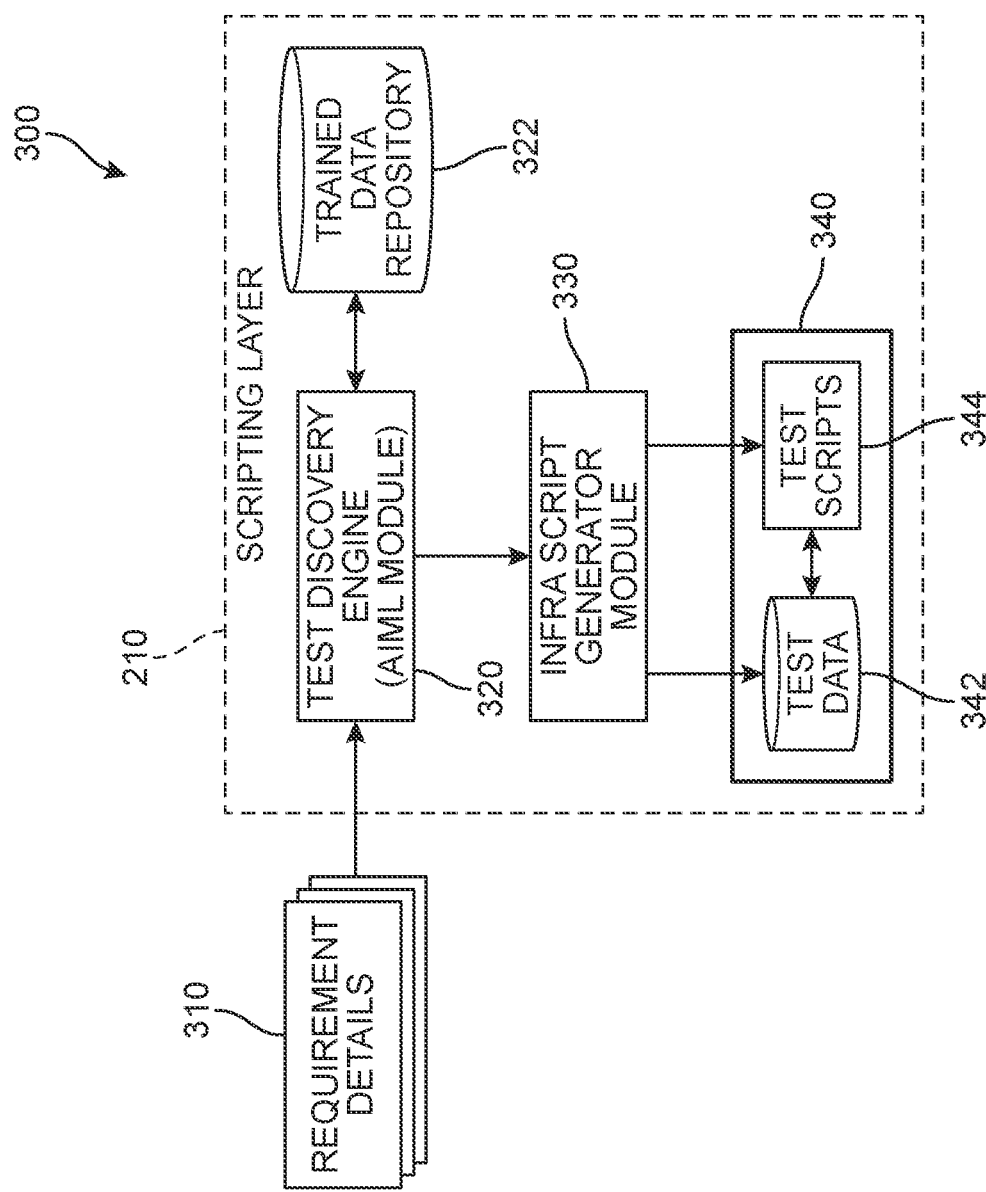
FIG. 3 is a schematic diagram of an embodiment of an architecture of
a scripting layer for the CLOUD INFRASTRUCTURE TEST AUTOMATION system, according to an embodiment.
Figure 4:
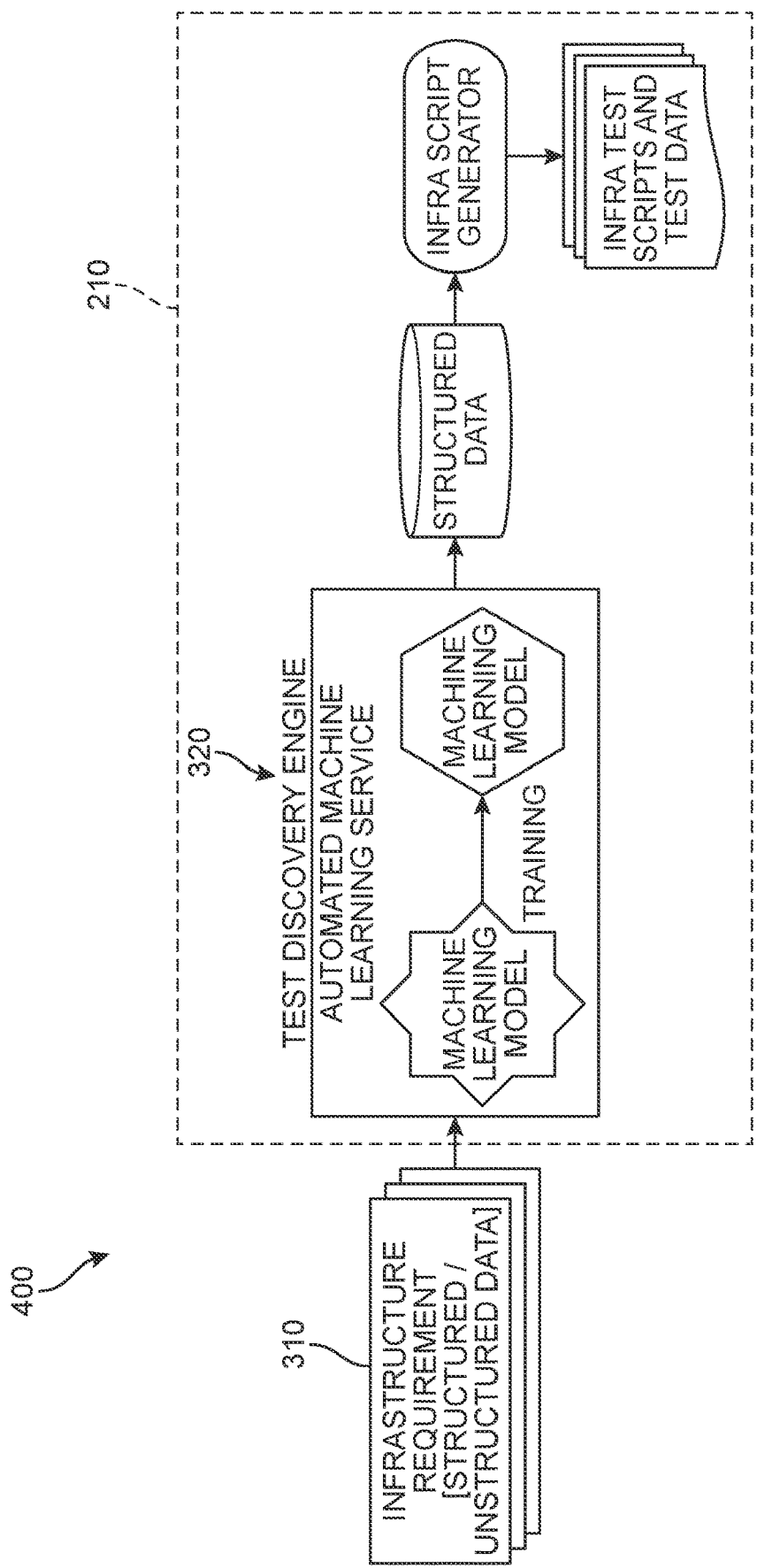
FIG. 4 is a schematic flow diagram representing transformation of unstructured requirement data to script and test data, according to an embodiment.

FIGS. 3 and 4 provide greater details regarding the scripting layer 210. As will be discussed below, the scripting layer 210 includes two modules, including a test discovery engine module ("test engine") 320, and an infra script generator module ("script generator") 330. The script generator 330 is responsible for generating infrastructure automation scripts for IaC resource validations.

As shown in FIG. 3, requirement details ("requirements") 310 are submitted to the scripting layer 210. Requirements 310 correspond to the desired project cloud infrastructure and includes resource requests that specify the hardware and software resources, and their configurations, that is needed for their individual projects (e.g., VMs with specified CPUs, memory type and quantity, and disk space; application packages; email servers; databases; networks; Kinesis streams; user logins; application and user permissions; encryption keys and algorithms; or other resources and configurations). In different embodiments, the developers can submit their resource definitions as project resource requests to the system.

In the context of the scripting layer 210, in different embodiments, the infrastructure-related data (requirements 310) can be categorized based on resources and their attributes which needs to be provisioned in cloud. The requirements 310 can be provided in a structured or an unstructured format. In different embodiments, requirement details can be the source of inputs for following teams (a) IaC Developers, who can build the IaC Configuration files for resource provisioning in targeted cloud based on this information and (b) the IaC Test Automation Team which can use the information to validate the properties/attributes of resources provisioned in cloud by IaC configuration files.

In cases where the requirements 310 are provided as unstructured data, the scripting layer 210 implements an artificial intelligence (AI)-guided machine learning (ML) algorithm via test engine 320, which helps to transform requirement details into structured data. The test engine 320 refers to a specialized trained data repository 322 when producing structured data. This data can then be provided as a source of input to script generator 330. In an alternate embodiment, requirements 310 can be developed as structured data and provided directly as input to the script generator 330. The scripting layer 210 performs a multi-step process that includes (a) receiving requirement details, (b) loading the details, (c) transforming the details to infrastructure test scripts, and (d) applying tool reusable packages to develop and execute more enhanced and enriched infrastructure test scripts which involve an array of micro components which together provide a robust solution for testing IaC resource provisioning in cloud.

Once the semi-structured or un-structured requirement details is fed to artificial intelligence module, the outputted structured data can be passed as an input to script generator 330 for generating validation scripts. The script generator 330 can produce both test data 342 and test scripts 344, collectively referred to here as test output 340.

FIG. 4 presents additional details regarding the processes performed by the scripting layer 210. As shown in FIG. 4, as requirements 310 are passed into the scripting layer 210, the test discovery engine 320 can, using AI-guided ML technology, including text analysis models, automatically break down and analyze semi-structured (and unstructured) infrastructure requirements text data into structured data 410 in preparation for processing by the script generator 330. In some embodiments, the ML model can continue to improve using the resultant extracted and transformed (meaningful) data, which can be stored in the training data repository 322 (see FIG. 3).

The structured data 410 is then passed to the script generator 330, which converts the data to produce test output 340 (infrastructure test scripts and associated test data). In different embodiments, script generator 330 can parse the structured infrastructure provisioning-related requirement data to a templatized test data sheet. Returning to FIG. 3, the outputted test data 342 can then be fetched by respective infra structure test scripts 344. In different embodiments, test data 342 is templatized and supported in multiple different formats like JSON, EXCEL and YAML, etc.

In some embodiments, test scripts 344 generated by script generator 330 can be reviewed by an infrastructure test engineer. Previously created/available test scripts can be further enriched using the proposed systems in order to address a greater number and more complex scenarios than possible by a human engineer. As a general matter, the test scripts 344 represents the different use cases that can be arrived at based on the received requirement (structured data). Each test script can be understood to represent an individual test, and can serve as either a standalone unit test or part of an end-to-end test that follows the respective outlines for the test steps. The test script can then make use of asset packages to connect targeted cloud environments as established by the decision layer (see FIG. 5). At that time, the test script can interact with the respective resources, and fetch all properties using the asset's cloud service packages (via the technology layer). These fetched values can then be compared against the test data sheet that were developed based on requirement details. Finally, the test steps and overall test results can be passed to a tool reporting component for generating test reports (see FIG. 7).

In different embodiments, some or all of the test output from scripting layer 210 can be received by the decision layer 222. Additional details regarding the decision layer 222 are presented now with reference to FIG. 5. It can be seen in FIG. 5 that the decision layer 222 further comprises a dynamic decision maker submodule ("decision maker") 510, and a decision taker submodule ("decision taker") 520. In some embodiments, the test output from scripting layer 210 is initially received by a scanning agent 512 of the decision maker 510. Thus, the decision layer 222 can be understood to serve as the entry point to the start of an executed automation test run. Decision layer 222 performs decision-based controller actions to intelligently and dynamically select the cloud platform(s) and data-sources that can be used during the testing, and configures the initial environment in preparation of a test run. In other words, the decision layer 222 can translate the scripts to a description that identifies all the specific resources which needs to be validated and validates them for its successful provisioning from the cloud against the requirements.

As part of this process, the decision maker 510 is configured to make decisions that can inform the system about the target cloud to be tested at run time. Once the scanning agent 512 receives and scans through the test scripts and data generated by the scripting layer 210, the scanning agent 512 can interpret and recognize the purpose of the scripts. This interpretation is used to develop logical blocks and group them together. Furthermore, in some embodiments, the scanning agent 512 can add the resource specific identifiers before passing the blocks to analyzer 534 for performing its matured routing purpose.

More specifically, in different embodiments, the scanning agent 512 can use text analytics (e.g., in the form of a natural language processing (NLP) rule-based engine) to create a logical block. In one embodiment, each logical block can be a combination of a cloud service and an added identifier. The identifier is identified or selected based on one or more context association algorithms. The logical block can include the associated cloud service parameters which can then be used further down by the other components during the actual validations. Every logical block can include a beginning statement and an end statement, which can be used by the system to determine the start and end of the logical block.

Figure 6:
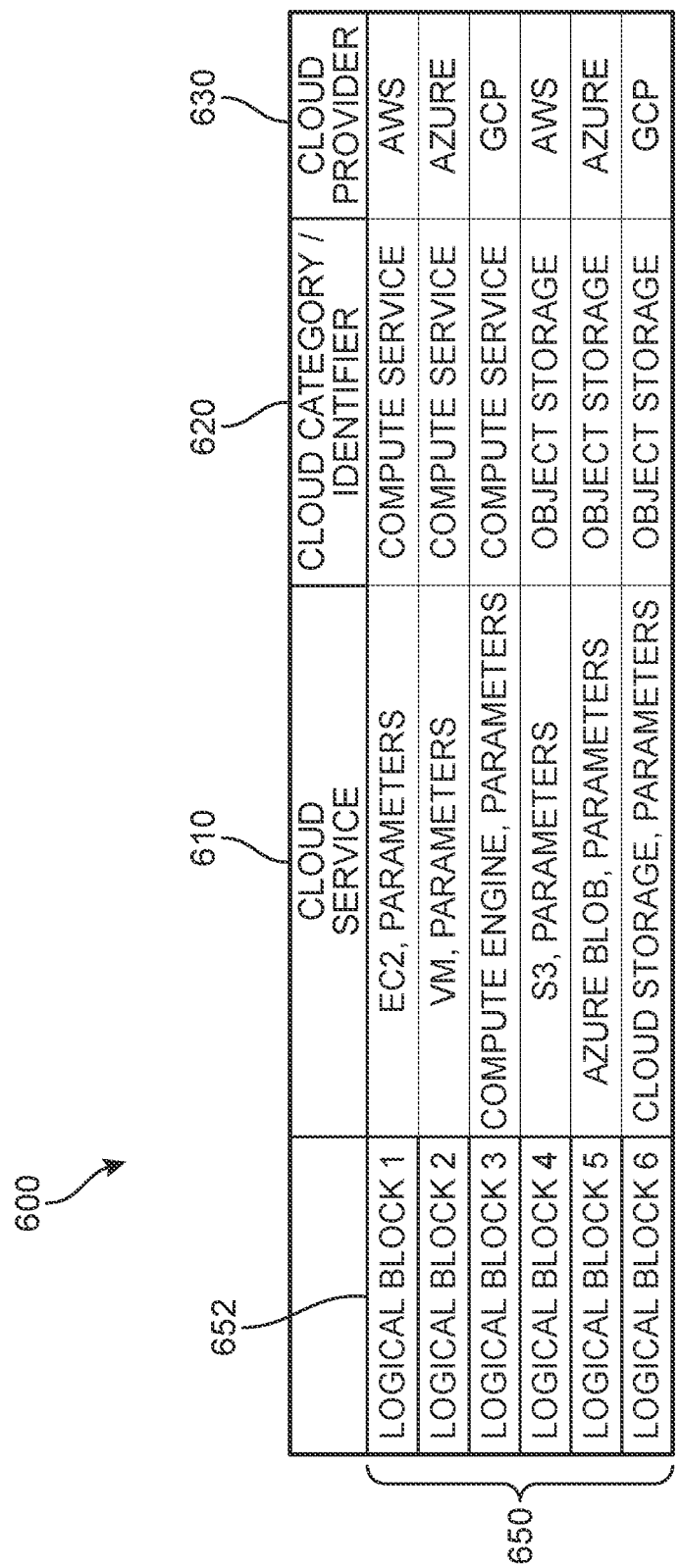
FIG. 6 is a matrix showing some examples of logical blocks, according to an embodiment.

FIG. 6 presents a non-limiting example 600 of some possible logical blocks 650 (shown here as a plurality of rows) that can be built by the scanning agent. Each logical block includes a resource definition that has been determined to match the test script requirements by the system. Simply for purposes of clarity, a first logical block 652 ("Logical Block 1") will be discussed. The first logical block 652 can be seen to include a first resource "EC2" under cloud service 610, with associated parameters. "Compute service" has been assigned as a cloud category or identifier 620 for the first logical block 652. In one embodiment, an additional category is a defined cloud provider 630 that falls under the cloud service category, such as Amazon Web Services® (AWS). The remaining five logical blocks 650 are similarly defined.

Returning to FIG. 5, in different embodiments, output of the scanning agent 512, in the form of the logical blocks, can be received by analyzer 514. Analyzer 514 includes an algorithm which runs to analyze the identified output of the scanning agent. This analysis provides the decision maker 510 with the capability to make a decision regarding what cloud platform to target and where to route the request to perform all workflow validations as defined in the test script. In one example, the analyzer 514 can process the logical blocks in a parallel or a sequential pattern. The analyzer 514 uses the rule-based engine to tag the logical block with an appropriate target cloud provider(s) and sends the request to the router. Thus, the analyzer 514 can verify the resources against the requirements that had been submitted. In some embodiments, this verification is performed based on classification algorithm(s) that are configured to label the resource with an identifier and group them logically into a cloud category and later add a cloud providers identifier.

The decision output from the analyzer 514 is then conveyed to the decision taker 520. The decision taker 520 includes a request router 522 that is configured to actively collect all information from the start of the scripts' execution until the end of the execution. The request router 522 then communicates this information to various components in the technology layer (see FIG. 7). Thus, the request router 522 controls the overall script executions and targets the cloud platform for required provisioned resources that need to be tested. In some embodiments, the request router 522 is further configured to receive data from a cloud credential manager 530, which stores the necessary cloud provider access credentials. The cloud credential manager 530 is configured to provide the necessary credentials details to the system, which uses this data to authenticate the different cloud environment and run the tests.

Figure 5:
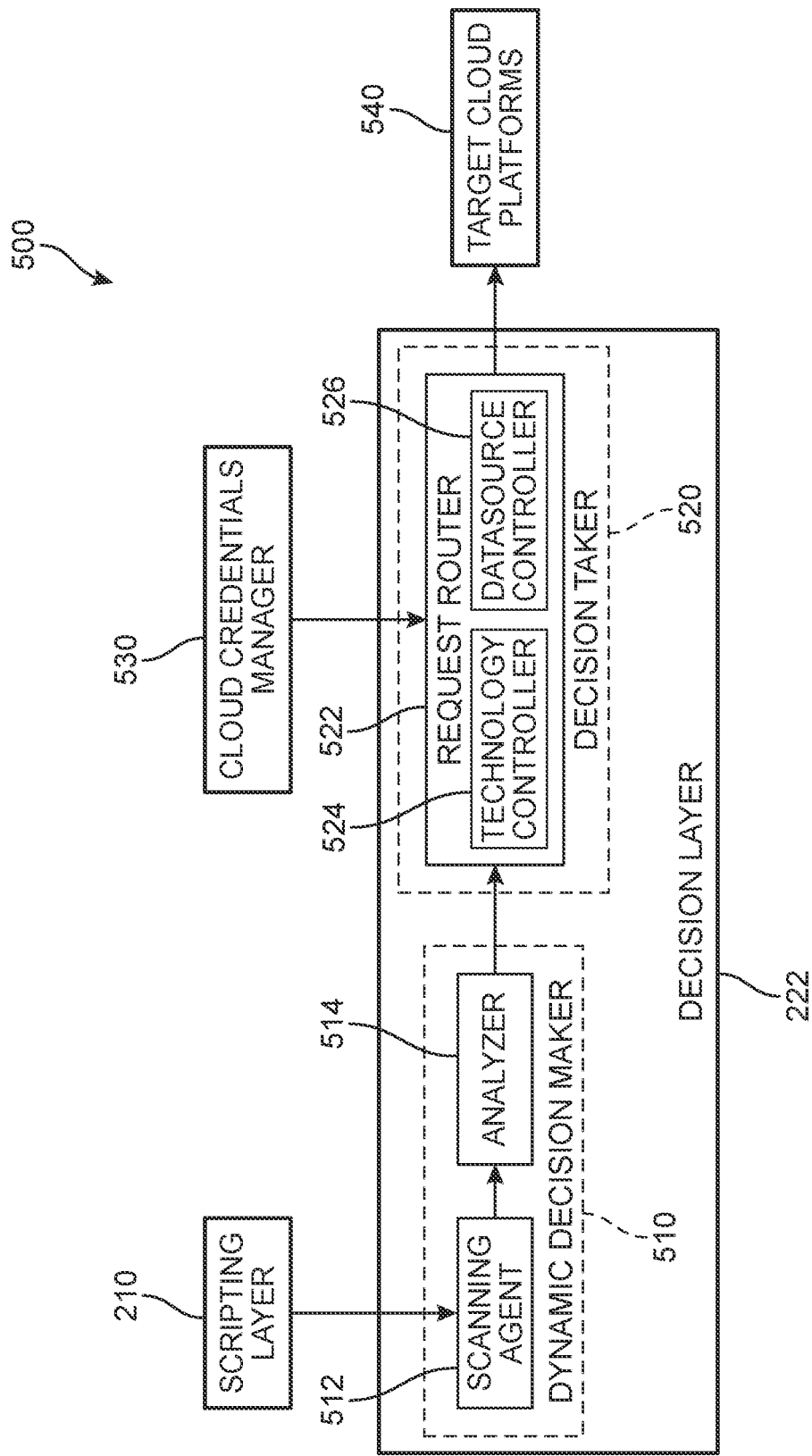
FIG. 5 is a schematic diagram of an embodiment of an architecture of a decision layer for the cloud infrastructure test automation system, according to an embodiment.

As shown in FIG. 5, the request router 522 further comprises a technology controller 524 and a data source controller 526. The technology controller 524 is configured to enable the system to further configure and interact with a targeted cloud platform 540 (e.g., AWS®, Microsoft Azure®, Google Cloud®, on-prem cloud platforms, etc.). In addition, technology controller 524 enables interaction with various low-level components in the technology layer. The data source controller 526 enables the system to configure the required data source format for data inputting to test automation scripts.

Figure 7:
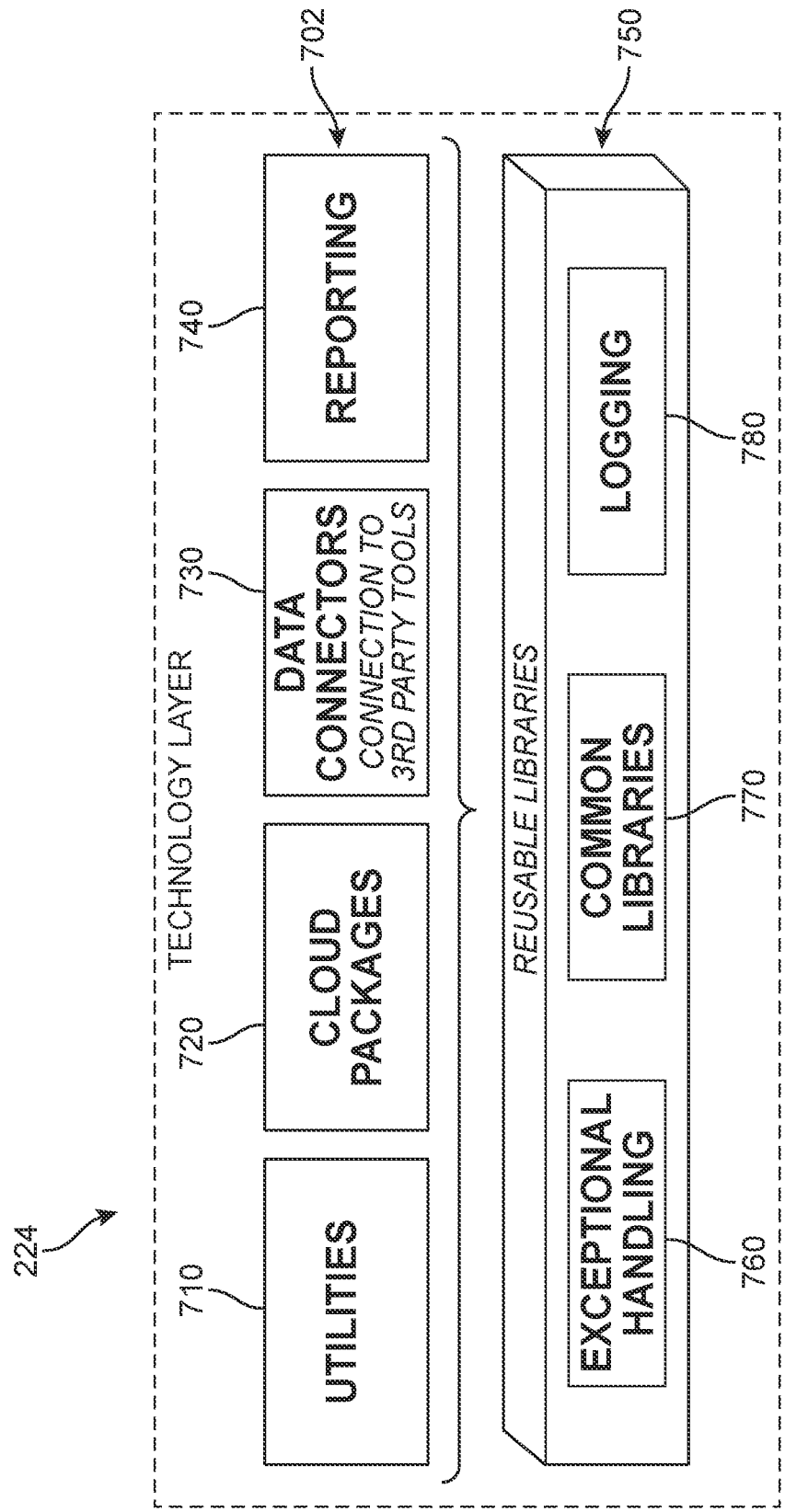
FIG. 7 is a schematic diagram of an embodiment of an architecture of a technology layer for the cloud infrastructure test automation system, according to an embodiment.

Referring now to FIG. 7, further details regarding the technology layer 224 are presented. In different embodiments, the technology layer 224 includes different components which can be categorized into multiple areas or categories. The components 702 are mainly categorized as either core components or re-usable components or libraries. Some examples of core components 702 include (a) a utilities component ("utilities") 710, (b) cloud packages component ("cloud packages") 720, (c) data connector(s) component ("data connectors") 730, and (d) reporting component 740.

The utilities 710 comprise a pack of libraries having generic functions which can be used across various layers, such as the scripting, controller, and technology layers. Utilities 710 can include functions to map database connections, Excel® or other spreadsheet or data storage operations, file operations, or any other results-oriented functions, etc. Cloud packages 720 include a pack of libraries which are developed to interact with cloud resources to perform certain operations during testing. For example, these libraries can establish the connection to targeted cloud platform, fetch all cloud resource properties provisioned by IaC code using cloud platform's provided software development kits (SDKs), and/or perform operations to verify the access and compliance check in the targeted cloud platform are as expected or not.

The data connectors 730 are used to connect the sources of test data available in different formats (e.g., JSON, YAML, EXCEL, CSV) from different third-party tools. Thus, data connectors 730 are configured to fetch data and make use of data for testing purposes. The reporting component 740 refers to a package of functions that are configured to collect the test validation results at each level of execution (step level and test script level). The reporting package can also keep track of execution results, and can be integrated with a standard enterprise reporting tool. In general, this component provides a standard reporting template which has the following attributes (1) Overall test run summary; (2) Detailed test script results; (3) Capture of execution time; and (4) Emailable test reporting structure.

In addition, the system also includes or otherwise has access to a plurality of re-usable components 750 (also referred to as re-usable libraries). Re-usable components 750 include functions and modules designed for use across test environments, significantly reducing maintenance and enhancement efforts. These libraries can be used for different projects. Some examples of re-usable components 750 include (a) exceptional handling component 760, (b) common libraries component 770, and (c) logging component 780. It can be appreciated that the use of re-usable libraries is a significant feature of the proposed systems, in contrast to conventional approaches that do not provide re-usable libraries for converting requirements to scripts, exceptional handlings, utilities, reports etc., nor enable connections to multi-cloud environments.

Every function is backed by exceptional handling methods. These methods are designed to ensure the state of the execution is not having any errors and entire execution is not at risk. Thus, the exceptional handling component 760 comprise of functions and methods that are available to ensure the tool is capable to handle different types of issues which can affect the smooth execution of the script (e.g., such as test data failure, a lost client connection session, etc.). In the event of such issues, test scripts can be able to perform alternate 'next steps' actions. The common libraries component 770 refer to a pack of libraries' files which includes set of functions that are specific to the proposed automation testing service. A test script can make use of these reusable functions to call a cloud package or other functions to perform various operations. For example, such functions can be used to authenticate the session user credentials, obtain the current time, perform a string operation, perform calendar functions, etc. Finally, the logging component 780 is responsible for the standard logging of actions performed by test scripts as well as recording of errors as a text file. The recordation can help in analyzing test results and enabling a swifter debugging of the flagged issues.

As described herein, the proposed system provides technology support across a variety of cloud platform; the IaC Test Automation service is capable of and supports major cloud platforms such as AWS®, Azure®, GCP®, Oracle®, and others. In addition, embodiments of the proposed system can be built using a wide range of programming languages, including but not limited to Python, Go, Ruby, Java or C.Net. The system offers tools that allow for ready integration with devOps pipelines, such as Jenkins, Travis CI, GitLab, Go continuous deliver, TeamCity, Buildbot, Bamboo, or any other enterprise-driven CI/CD (continuous integration/continuous delivery) tools. In some embodiments, GitHub or Bit Bucket can be used for versioning controlling of scripts. Furthermore, the system is configured to work with available test management tools, such as MF Octane, qTest, Zephyr, SpiraTeam, Rally, JIRA, Polarion, CodeBeamer, and other application life cycle-management (ALM) tools for storing test cases and test execution results. The system can also reuse test data and execute different combinations across many different test data formats (e.g., JSON, YAML, Excel®, etc.). Thus, cloud infrastructure test automation represents a powerful shift in cloud infrastructure development by enabling automated identification of infrastructure issues early in the life cycle of development, easy reproduction of issues in the lower environment, a clear demarcation of roles for developers, automated validations, and seamless integration with existing DevOps pipelines.

Figure 8A:
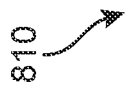
FIGS. 8A and 8B are examples of reporting interfaces for the cloud infrastructure test automation system, according to an embodiment.
Figure 8B:
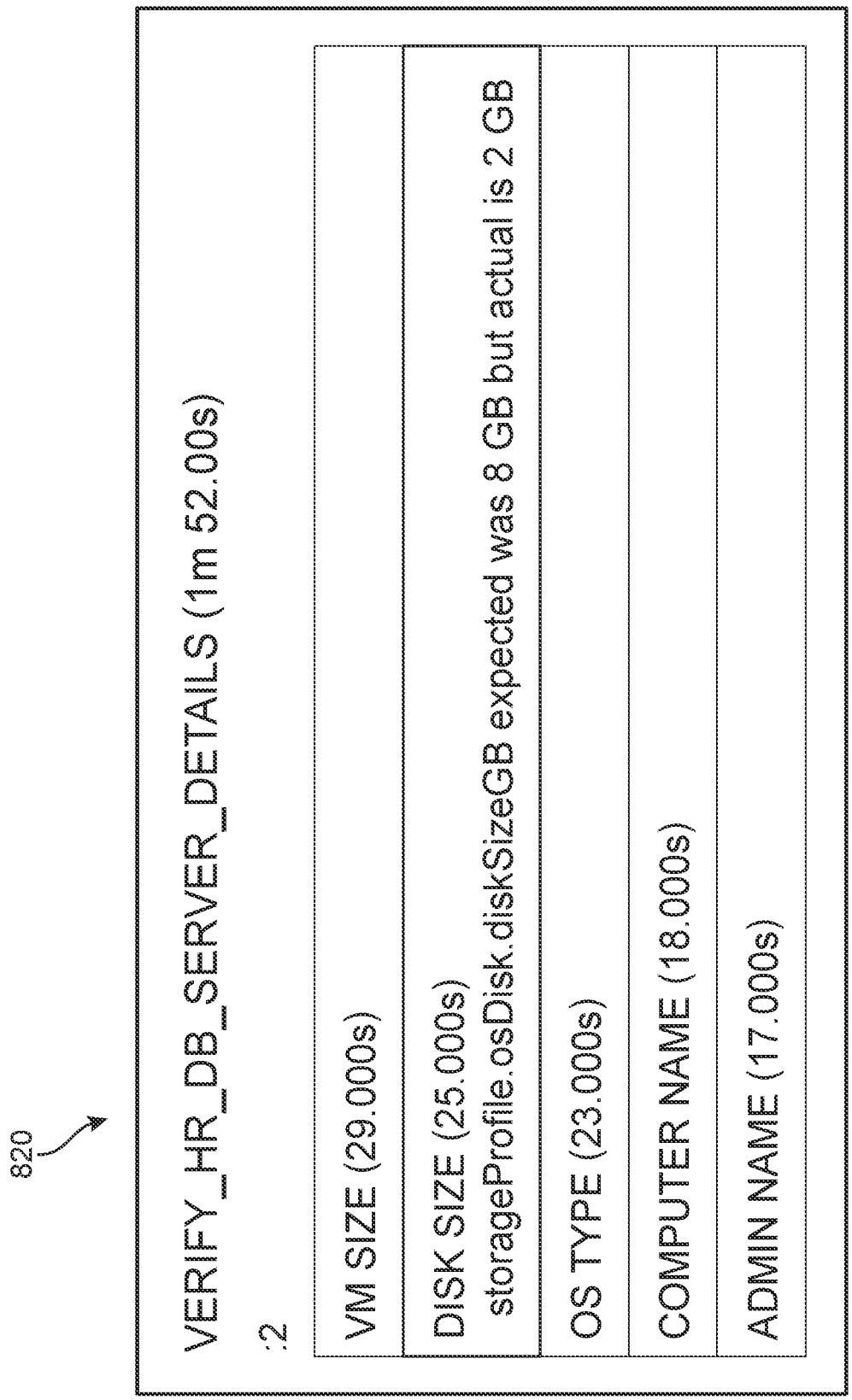

As noted earlier, details of the validation test results can be generated automatically as a consolidated report. In some embodiments, the results are shared in a html format to stakeholders via a CI/CD pipeline. Simply for purposes of illustration, one scenario of a use-case of an embodiment of the proposed system will now be discussed. In this scenario, a client seeks to migrate their business's on-premises infrastructure to a cloud platform. More specifically, a Human Resource full stack application domain cloud infrastructure is understood as requiring two servers: a first server for web services, and a second server to provide database services. Thus, a new cloud infrastructure environment is to be provisioned in AWS® by creating AWS® resources (2—EC2, 1—Security Group) for running a Human Resource (HR) application with the following configuration: (a) Web Server—vCPU: 2, RAM: 4 GB, Disk Size: 8 GB, Operating System: Linux/Unix 64-bit version, and Software: Apache HTTP server 2.4.52; (b) Database Server—vCPU: 2, RAM: 4 GB, Disk Size: 8 GB, and Operating System: Linux/Unix 64-bit version. Before the full stack application is deployed onto AWS®, infrastructure testing must be conducted. An example of a cloud infrastructure test automation report 810 is presented in FIG. 8A, providing an outcome for each scenario. Upon selecting the second scenario, additional details are provided, as represented by an error report 820 in FIG. 8B.

Thus, using embodiments of the system described herein, the infrastructure development team deploys the IaC in the AWS® cloud platform. The cloud infrastructure test automation validation process involves the automated development of automation scripts, with the scripts being enriched by the system to cover all possible use cases. These scripts are executed on the AWS® cloud platform. In addition, the provisioned resources properties are fetched over a direct connection to the AWS® cloud platform. Finally, the fetched property is validated against the business requirement configuration details. The new IaC is then ready for deployment to the live IT environment.

Figure 9:
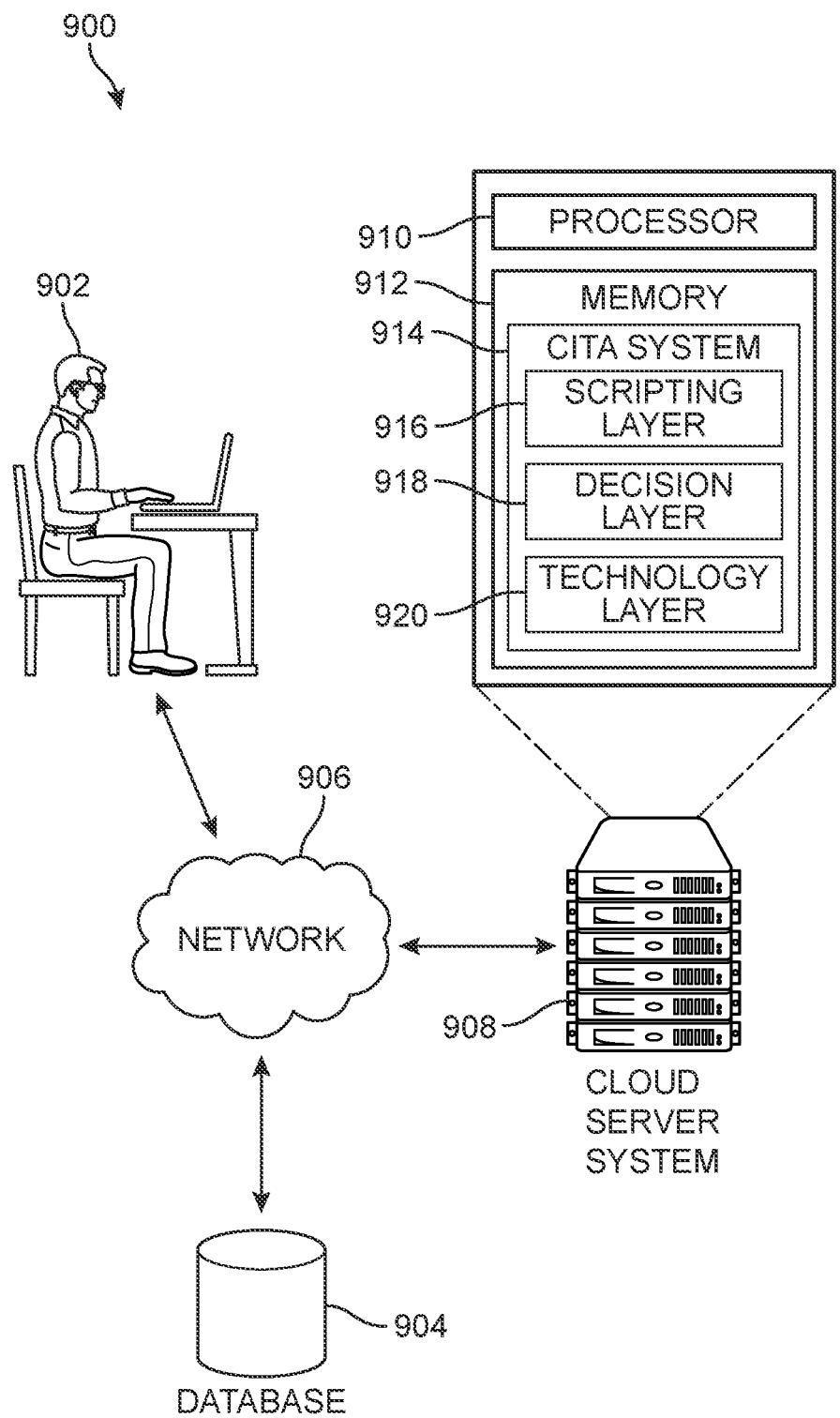
FIG. 9 is a diagram depicting example environments and components by which systems and/or methods, described herein, may be implemented.

FIG. 9 is a schematic diagram of an environment 900 for a cloud infrastructure test automation system 914 (or simply, system 914), according to an embodiment. The environment 900 may include a plurality of components capable of performing the disclosed method of content validation (e.g., method 1000 below). For example, environment 900 includes a user device 902, a computing/server system 908, and a database 904. The components of system 900 can communicate with each other through a network 906. For example, user device 902 may retrieve information from database 904 via network 906. In some embodiments, network 906 may be a wide area network ("WAN"), e.g., the Internet. In other embodiments, network 906 may be a local area network ("LAN").

As shown in FIG. 9, components of the system 914 may be hosted in computing system 908, which may have a memory 912 and a processor 910. Processor 910 may include a single device processor located on a single device, or it may include multiple device processors located on one or more physical devices. Memory 912 may include any type of storage, which may be physically located on one physical device, or on multiple physical devices. In some cases, computing system 908 may comprise one or more servers that are used to host the automation system.

While FIG. 9 shows one user device, it is understood that one or more user devices may be used. For example, in some embodiments, the system may include two or three user devices. In some embodiments, the user device may be a computing device used by a user. For example, user device 902 may include a smartphone or a tablet computer. In other examples, user device 902 may include a laptop computer, a desktop computer, and/or another type of computing device. The user devices may be used for inputting, processing, and displaying information. Referring to FIG. 9, environment 900 may further include database 904, which stores test data, training data, and/or other related data for automation system as well as external data. This data may be retrieved by other components for system 914. As discussed above, system 914 may include a scripting layer 916, a decision layer 918, and a technology layer 920. Each of these components may be used to perform the operations described herein.

Figure 10:
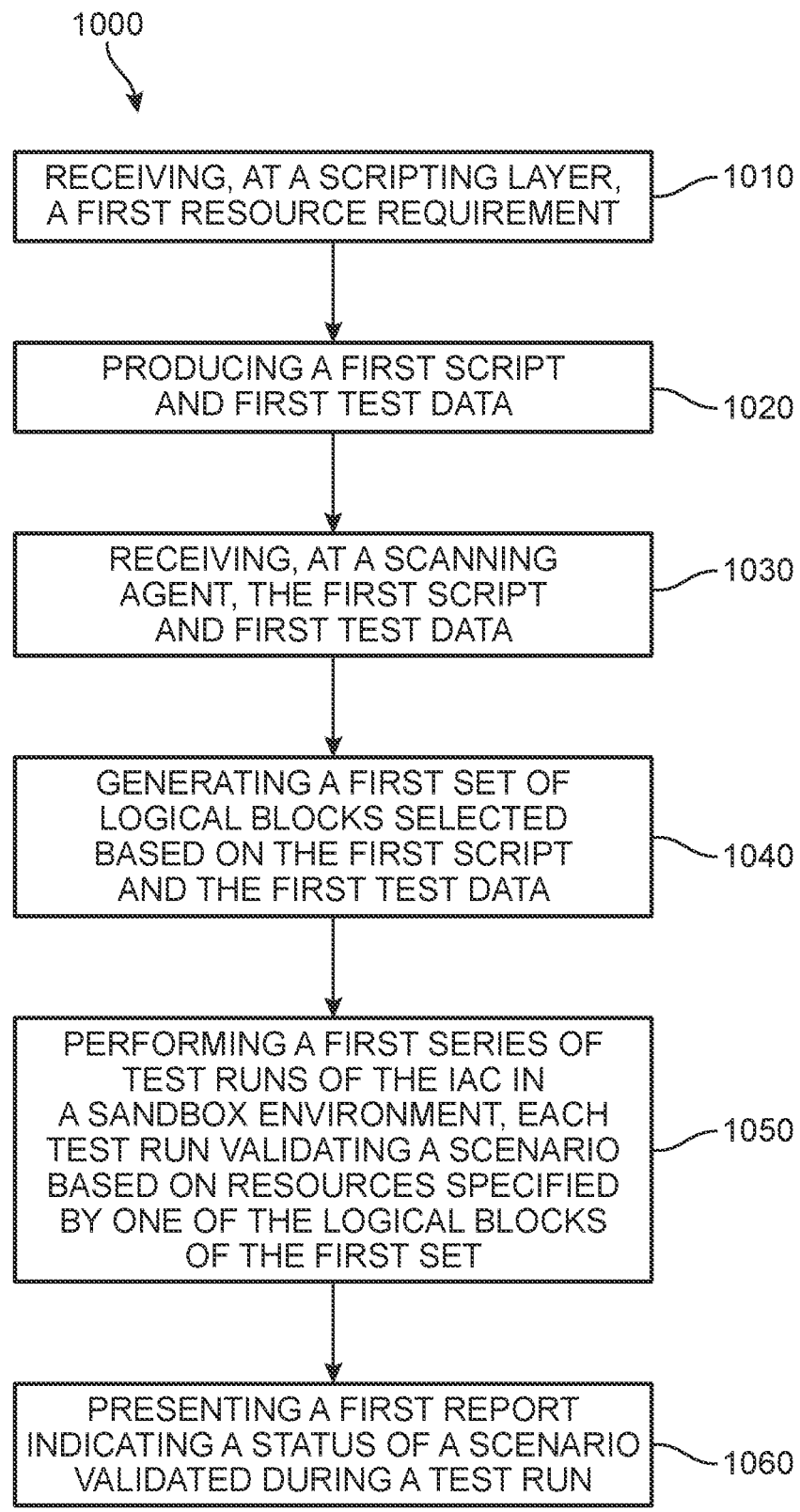
FIG. 10 is a flow chart depicting a method of validating infrastructure as code (IaC), according to an embodiment.

FIG. 10 is a flow chart illustrating an embodiment of a computer implemented method 1000 of validating infrastructure as code (IaC). The method 1000 includes a first step 1010 of receiving, at a scripting layer of a cloud infrastructure test automation system, a first resource requirement. A second step 1020 includes producing, via the scripting layer and based on the first resource requirement, a first script and a first test dataset, and a third step 1030 includes receiving, at a scanning agent of a decision layer of the system, the first script and first test dataset. In addition, the method 1000 includes a fourth step 1040 of generating, via the scanning agent, a first set of logical blocks selected based on the first script and the first test dataset, each logical block representing a type of resource, and a fifth step 1050 of performing a first series of test runs of the IaC in a sandbox environment, each test run validating a scenario based on resources specified by one of the logical blocks of the first set. Furthermore, the method 1000 includes a sixth step 1060 of presenting, at a client computing device, a first report indicating a status of the scenario validated during a test run.

In other embodiments, the method may include additional steps or aspects. In one example, the first set of logical blocks represents a configuration of resources that can potentially support the IaC. In some embodiments, the method also includes steps of receiving, at the scripting layer, a second resource requirement, producing, via the scripting layer and based on the second resource requirement, a second script and a second test dataset, receiving, at the scanning agent, the second script and second test dataset, and generating, via the scanning agent, a second set of logical blocks selected based on the second script and the second test dataset, the logical blocks of the second set being different than the logical blocks of the first set.

In one embodiment, each logical block of the first set of logical blocks represents a group of resources associated with a specific cloud platform. In another embodiment, the scanning agent creates logical blocks using text analytic processing of the first script and first test dataset. in some embodiments, the method also includes a step of determining a first resource associated with a first scenario is insufficient for supporting the IaC. In another example, each logical block includes a resource specific identifier selected using an association algorithm.

In some embodiments, the method also includes steps of receiving, at an analyzer of the decision layer, the first set of logical blocks, and verifying, at the analyzer, each logical block against the first resource requirement. In another embodiment, the method further includes a step of determining, via a rules-based engine of the analyzer, which cloud platform should be assigned to each logical block of the first set. In some examples, the first resource requirement includes unstructured data, and the method further comprises transforming the unstructured data into structured data via a machine learning algorithm.

Features, aspects, tools, components, modules, and other elements of embodiments of the disclosed system can also be found in U.S. Pat. No. 10,360,025 to Foskett et al., issued Jul. 23, 2019 and titled "Infrastructure Instantiation, Collaboration, and Validation Architecture for Serverless Execution Frameworks", the application of which is hereby incorporated by reference in its entirety.

It should be understood that the systems and/or methods as described herein may be implemented using different computing systems, components, modules, and connections. An end-user or administrator may access various interfaces provided or supported by the policy management service, for example, via one or more devices capable of receiving, generating, storing, processing, and/or providing information, such as information described herein. For example, a user device may include a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), or a similar type of device. In some implementations, user device may receive information from and/or transmit information to the policy management service platform. For example, a device may include a bus, a processor, a memory, a storage component, an input component, an output component, and a communication interface.

The bus can include a component that permits communication among the components of the device. The processor is implemented in hardware, firmware, or a combination of hardware and software. The processor is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, a processor includes one or more processors capable of being programmed to perform a function. Memory includes a random access memory (RAM), a read only memory (ROM), and/or another type of dynamic or static storage device (e.g., a flash memory, a magnetic memory, and/or an optical memory) that stores information and/or instructions for use by a processor(s).

In addition, storage components store information and/or software related to the operation and use of the device. For example, storage components may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Furthermore, an input component includes a component that permits the device to receive information, such as via user input (e.g., a touch screen display, a keyboard, a keypad, a mouse, a button, a switch, and/or a microphone). Additionally, or alternatively, input components may include a sensor for sensing information (e.g., a global positioning system (GPS) component, an accelerometer, a gyroscope, and/or an actuator). The output component includes a component that provides output information from a device (e.g., a display, a speaker, and/or one or more light-emitting diodes (LEDs)).

A communication interface includes a transceiver-like component (e.g., a transceiver and/or a separate receiver and transmitter) that enables a device to communicate with other devices, such as via a wired connection, a wireless connection, or a combination of wired and wireless connections. The communication interface may permit the device to receive information from another device and/or provide information to another device. For example, a communication interface may include an Ethernet interface, an optical interface, a coaxial interface, an infrared interface, a radio frequency (RF) interface, a universal serial bus (USB) interface, a Wi-Fi interface, a cellular network interface, and/or the like.

Thus, the device may perform one or more processes described herein. The device may perform these processes based on processor executing software instructions stored by a non-transitory computer-readable medium, such as memory and/or storage component. A computer-readable medium is defined herein as a non-transitory memory device. A memory device includes memory space within a single physical storage device or memory space spread across multiple physical storage devices.

Software instructions may be read into memory and/or storage components from another computer-readable medium or from another device via communication interface. When executed, software instructions stored in memory and/or storage component may cause processor to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

In some implementations, a policy management service may be hosted in a cloud computing environment. Notably, while implementations described herein describe a policy management service as being hosted in cloud computing environment, in some implementations, a policy management service may not be cloud-based (i.e., may be implemented outside of a cloud computing environment) or may be partially cloud-based.

Cloud computing environment can include, for example, an environment that hosts the policy management service. The cloud infrastructure environment may provide computation, software, data access, storage, etc. services that do not require end-user knowledge of a physical location and configuration of system(s) and/or device(s) that hosts the policy management service. For example, a cloud computing environment may include a group of infrastructure resources (referred to collectively as "computing resources" and individually as "computing resource").

Cloud infrastructure resources includes one or more database, virtual private networks, server devices, or other types of computation and/or cloud resources. In some implementations, computing resources may host the policy management service. The cloud resources may include compute instances executing in computing resource, storage devices provided in computing resource, data transfer devices provided by computing resource, etc. In some implementations, computing resource may communicate with other computing resources via wired connections, wireless connections, or a combination of wired and wireless connections. In some embodiments, a computing resource includes a group of cloud resources, such as one or more applications ("APPs"), one or more virtual machines ("VMs"), virtualized storage ("VSs"), one or more hypervisors ("HYPs"), and/or the like.

Application includes one or more software applications that may be provided to or accessed by user devices. Application may eliminate a need to install and execute the software applications on a user device. For example, an application may include software associated with the policy management service and/or any other software capable of being provided via cloud computing environment 222, while in some embodiments, other applications are provided via virtual machines. A virtual machine can include a software implementation of a machine (e.g., a computer) that executes programs like a physical machine. A virtual machine may be either a system virtual machine or a process virtual machine, depending upon use and degree of correspondence to any real machine by virtual machine. A system virtual machine may provide a complete system platform that supports execution of a complete operating system ("OS"). A process virtual machine may execute a single program, and may support a single process. In some embodiments, virtual machines may execute on behalf of a user (e.g., a user of user device or an administrator of the policy management service), and may manage infrastructure of cloud computing environment, such as data management, synchronization, or long-duration data transfers.

Virtualized storage includes one or more storage systems and/or one or more devices that use virtualization techniques within the storage systems or devices of computing resources. In some embodiments, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisors may provide hardware virtualization techniques that allow multiple operating systems (e.g., "guest operating systems") to execute concurrently on a host computer, such as a computing resource. Hypervisors may present a virtual operating platform to the guest operating systems, and may manage the execution of the guest operating systems. Multiple instances of a variety of operating systems may share virtualized hardware resources.

A network includes one or more wired and/or wireless networks. For example, networks may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

An "interface" may be understood to refer to a mechanism for communicating content through a client application to an application user. In some examples, interfaces may include pop-up windows that may be presented to a user via native application user interfaces (UIs), controls, actuatable interfaces, interactive buttons or other objects that may be shown to a user through native application UIs, as well as mechanisms that are native to a particular application for presenting associated content with those native controls. In addition, the terms "actuation" or "actuation event" refers to an event (or specific sequence of events) associated with a particular input or use of an application via an interface, which can trigger a change in the display of the application. Furthermore, a "native control" refers to a mechanism for communicating content through a client application to an application user. For example, native controls may include actuatable or selectable options or "buttons" that may be presented to a user via native application UIs, touch-screen access points, menus items, or other objects that may be shown to a user through native application UIs, segments of a larger interface, as well as mechanisms that are native to a particular application for presenting associated content with those native controls. The term "asset" refers to content that may be presented in association with a native control in a native application. As some non-limiting examples, an asset may include text in an actuatable pop-up window, audio associated with the interactive click of a button or other native application object, video associated with a teaching user interface, or other such information presentation.

In addition to the algorithms and techniques described above, one or more of the following techniques may be utilized by one or more of the disclosed embodiments: RPA, Mongo DB, AI Modules such as Python, Image to Text, OCR, Computer Vision, Image comparison (phase comparison), Image Validation (image to text, then text to text comparison), Learning Algorithms, Similarity Analytics, Sequencing algorithms, Random Forest, gCNN, Data Clustering with weighted data, Data Visualization, Rocket Chat, and D3JS.

For purposes of the current description, the terms "organization," "client," "organization resources," or "client resources" refer to database resources (i.e., data, metadata, programs, and other resources) that are maintained in a central multi-tenant database for access by users who have appropriate access privileges. Such resources can generally be managed by a server and data storage system maintained by a platform provider, as opposed to computers within the actual client (tenant) businesses themselves. In addition, a Cloud Service Provider (CSP) may include an organization that provides a cloud computing resource to a client device and/or a user of a client device. Furthermore, the term "component" refers to software applications and other system modules and features comprising or supporting the multi-tenant architecture.

In one implementation, the cloud infrastructure test automation systems described herein include hardware data storage. Among other operational data, the hardware data storage may store instantiation rules and instantiation metadata. Instantiation circuitry interprets the requirement syntax and executes the instantiation rules with input from the instantiation metadata to issue infrastructure instantiation requests to cause instantiation of the resources requested by the developers. Further, state file unification circuitry facilitates developer collaboration by receiving and managing state files for the individual developer projects. In addition, in some embodiments, the cloud infrastructure test automation systems described herein includes a validation circuitry. The validation circuitry helps to ensure that the instantiation requests that the cloud infrastructure test automation systems described herein makes to the infrastructure providers are completed correctly, cause the expected infrastructure results, and that the infrastructure remains correct over time. To that end, the validation circuitry issues validation requests to the infrastructure providers. The infrastructure providers return ICV messages to the cloud infrastructure test automation systems described herein. Examples of ICV messages include responses to validation requests, responses to instantiation requests, and infrastructure status messages.

The instantiation circuitry, state file unification circuitry, validation circuitry, requests, and other features of the cloud infrastructure test automation systems described herein improve the operation and function of the underlying computer hardware itself. That is, these features (among others described) are specific improvements in way that the underlying computer system operates and solve technical challenges with infrastructure instantiation and validation, as well as developer collaborating in serverless execution environments. The improvements facilitate more efficient, accurate, consistent, and precise building of resources that can operate properly in serverless function environments. The improved functioning of the underlying computer hardware itself achieves further technical benefits. For example, the cloud infrastructure test automation systems described herein avoids lack of automation, reduces manual intervention, reduces the possibility for human error, and therefore increases infrastructure instantiation efficiency and reduces wait times for correct resource setup and execution. In addition, the cloud infrastructure test automation systems described herein provides additional abstraction, so that testers need not be complete experts in complex IaC syntaxes. The developers may instead concentrate on the particular goals of their projects with less time and energy spent on mastering intricate IaC coding.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways.

Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A computer-implemented method of validating infrastructure as code (IaC), the method comprising:
receiving, at a scripting layer of a cloud infrastructure test automation system, a first resource requirement, wherein the first resource requirement includes unstructured data;

responsive to receiving the first resource requirement, via the scripting layer, automatically applying a machine learning algorithm to convert the first resource requirement to structured data;

automatically producing, via the scripting layer and based on the structured data, a first infrastructure test script and a first corresponding test dataset;

receiving, at a scanning agent of a decision layer of the system, the first infrastructure test script and the first corresponding test dataset;

using natural language processing to generate, via the scanning agent of the decision layer, a first set of logical blocks based on the first infrastructure test script and the first corresponding test dataset, wherein generating the first set of logical blocks includes using an association algorithm to select a cloud provider for each logical block of the first set of logical blocks, wherein the first set of logical blocks represents a configuration of resources verified against the first resource requirements that support the IaC;

responsive to the scanning agent generating the verified set of logical blocks, automatically executing the first infrastructure test script to perform a first series of test runs of the IaC in a sandbox environment, each test run validating a scenario based on the cloud provider specified by one of the logical blocks of the first set; and responsive to the scenarios being validated for the first series of test runs, deploying the IaC.

2. The method of claim 1, further comprising:

receiving, at the scripting layer, a second resource requirement;

producing, via the scripting layer and based on the second resource requirement, a second infrastructure test script and a second corresponding test dataset;

receiving, at the scanning agent, the second infrastructure test script and the second corresponding test dataset; and generating, via the scanning agent, a second set of logical blocks based on the second infrastructure test script and the second corresponding test dataset, the logical blocks of the second set being different than the logical blocks of the first set.

3. The method of claim 1, wherein each logical block of the first set of logical blocks represents a group of resources associated with a specific cloud platform.

4. The method of claim 1, wherein producing the first corresponding test dataset includes converting the structured data, via the scripting layer, by parsing the structured data to a templatized test dataset.

5. The method of claim 1, wherein generating the first set of logical blocks further includes using the association algorithm to select a cloud service of the cloud provider for each logical block of the first set of logical blocks.

6. The method of claim 5, further comprising:

receiving, at an analyzer of the decision layer, the first set of logical blocks; and verifying, at the analyzer, each logical block of the first set of logical blocks against the first resource requirement.

7. The method of claim 6, further comprising receiving cloud access credentials at a request router of the decision layer from a cloud credentials manager and wherein executing the first infrastructure test script to perform the first series of test runs of the IaC further includes using the cloud access credentials to authenticate the selected cloud provider.

8. The method of claim 1, wherein the first infrastructure test script includes reusing functions from a reusable library.

9. A non-transitory computer-readable medium storing software comprising instructions executable by one or more computers which, upon such execution, cause the one or more computers to:

receive, at a scripting layer of a cloud infrastructure test automation system, a first resource requirement for an infrastructure as code (IaC), wherein the first resource requirement includes unstructured data;

responsive to receiving the first resource requirement, via the scripting layer, automatically apply a machine learning algorithm to convert the first resource requirement to structured data;

automatically produce, via the scripting layer and based on the structured, a first infrastructure test script and a first corresponding test dataset;

receive, at a scanning agent of a decision layer of the system, the first infrastructure test script and the first corresponding test dataset;

use natural language processing to generate, via the scanning agent of the decision layer, a first set of logical blocks based on the first infrastructure test script and the first corresponding test dataset, wherein generating the first set of logical blocks includes using an association algorithm to select a cloud provider for each logical block of the first set of logical blocks, wherein the first set of logical blocks represent a configuration of resources verified against the first resource requirements that support the IaC;

responsive to the scanning agent generating the verified set of logical blocks, automatically execute the first infrastructure test script to perform a first series of test runs of the IaC in a sandbox environment, each test run validating a scenario based on the cloud provider specified by one of the logical blocks of the first set; and responsive to the scenarios being validated for the first series of test runs, deploy the IaC.

10. The non-transitory computer-readable medium storing software of claim 9, wherein the instructions further cause the one or more computers to:

receive, at the scripting layer, a second resource requirement;

produce, via the scripting layer and based on the second resource requirement, a second infrastructure test script and a second corresponding test dataset;

receive, at the scanning agent, the second infrastructure test script and the second corresponding test dataset; and generate, via the scanning agent, a second set of logical blocks based on the second infrastructure test script and the second corresponding test dataset, the logical blocks of the second set being different than the logical blocks of the first set.

11. The non-transitory computer-readable medium storing software of claim 9, wherein each logical block of the first set of logical blocks represents a group of resources associated with a specific cloud platform.

12. A system for automatically validating infrastructure as code (IaC), comprising one or more computers and one or more storage devices storing instructions that are operable, when executed by the one or more computers, to cause the one or more computers to:

receive, at a scripting layer of a cloud infrastructure test automation system, a first resource requirement for an infrastructure as code (IaC), wherein the first resource requirement includes unstructured data;

automatically produce, via the scripting layer and based on structured, a first infrastructure test script and a first corresponding test dataset;

receive, at a scanning agent of a decision layer of the system, the first infrastructure test script and the first corresponding test dataset;

use natural language processing to generate, via the scanning agent of the decision layer, a first set of logical blocks based on the first infrastructure test script and the first corresponding test dataset, wherein generating the first set of logical blocks includes using an association algorithm to select a cloud provider for each logical block of the first set of logical blocks, wherein the first set of logical blocks represents a configuration of resources verified against the first resource requirements that support the IaC;

automatically execute the first infrastructure test script to perform a first series of test runs of the IaC in a sandbox environment, each test run validating a scenario based on the cloud provider specified by one of the logical blocks of the first set; and responsive to the scenarios being validated for the first series of test runs, deploy the IaC.

13. The system of claim 12, wherein generating the first set of logical blocks further includes using the association algorithm to select a cloud service of the cloud provider for each logical block of the first set of logical.

14. The system of claim 13, wherein the instructions further cause the one or more computers to receive cloud access credentials at a request router of the decision layer from a cloud credentials manager and wherein executing the first infrastructure test script to perform a first series of test runs of the IaC further includes using the cloud access credentials to authenticate the selected cloud provider.

15. The system of claim 12, wherein the first infrastructure test script includes reusing functions from a reusable library.

* * * * *